March 10, 1936.    H. F. FISHER    2,033,137
DEHYDRATOR WITH PRELIMINARY TREATMENT
Filed Dec. 18, 1929
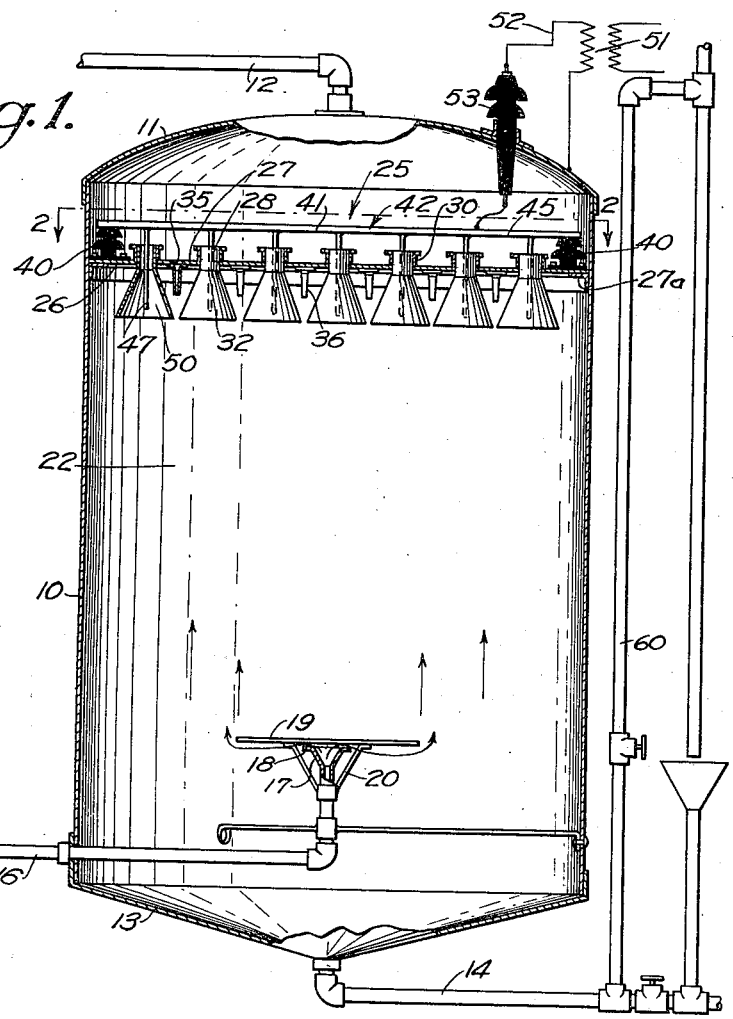
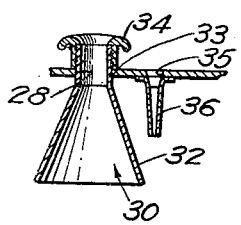
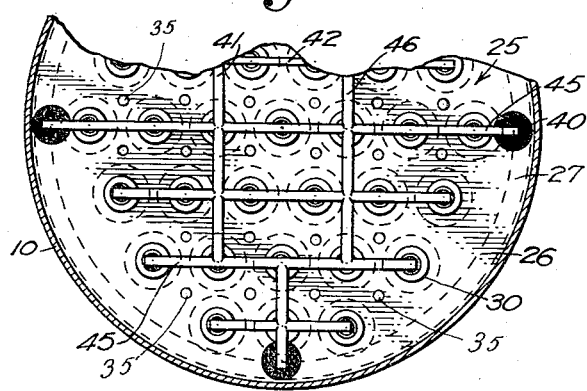
INVENTOR:
Harmon F. Fisher,
BY
ATTORNEY.

Patented Mar. 10, 1936

2,033,137

UNITED STATES PATENT OFFICE 2,033,137

DEHYDRATOR WITH PRELIMINARY TREATMENT

Harmon F. Fisher, Long Beach, Calif., assignor to Petroleum Rectifying Company of California, Los Angeles, Calif., a corporation of California Application December 18, 1929, Serial No. 414,917

7 Claims. (Cl. 204—24)

My invention relates to electric treaters, and more particularly to that type of a treater which finds utility in separating the phases of a petroleum emulsion, although the invention is not limited thereto.

In my co-pending application Serial No. 132,376, filed August 30, 1926, I have disclosed a process of separating the phases of an emulsion by subjecting the emulsion to successively higher electric fields during the upward movement thereof in a tank. The present invention is an improvement over this co-pending application and in addition incorporates certain other novel features which find utility in separating the phases of a petroleum emulsion as well as in other capacities.

It is an object of this invention to provide a method of and apparatus for dropping charged particles through a body of rising emulsion, these particles being preferably obtained by treating the emulsion itself.

A further object of the invention is to subject an emulsion to an electric field of increasing gradient to effect a treatment thereof and to allow the particles separated from the emulsion to drop from the field before the emulsion passes through that portion of the field which is of maximum intensity. Thus, the emulsion becomes drier as it passes into the higher intensity portion of the field.

Still a further object of the invention is to provide a dehydrating apparatus including a tank, in the upper end of which are positioned the electrodes, and into the lower end of which the emulsion is introduced.

Further objects of the invention lie in the particular electrode structure, and in the other novel features of construction to be hereinafter described.

Still further objects and advantages will be apparent to those skilled in the art.

Referring to the drawing in which I have illustrated a preferred form of my invention,—

Fig. 1 is a sectional view of a dehydrating apparatus illustrating the features of my invention.

Fig. 2 is a sectional view taken on the line 2—2 of Fig. 1.

Fig. 3 is an enlarged sectional view of a portion of the electrode structure shown in Fig. 1.

Referring particularly to Fig. 1, I find it preferable to utilize a tank 10 provided with a cover 11 to which is secured a dry oil outlet pipe 12, and provided with a bottom 13 to which is attached a bleed pipe 14.

The emulsion, or other fluid to be treated, passes through a pipe 16 and is discharged therefrom into the lower end of the tank 10 through a nozzle 17 providing a flange 18. A baffle plate 19 is supported above the flange 18 by brackets 20 and cooperates with this flange in defining an annular space through which the emulsion is forced, this emulsion moving outward under the baffle plate 19 and rising therearound through a preliminary treating space 22 formed in the central portion of the tank 10.

In the upper end of the tank 10 is an electrode structure 25 of a novel construction. Forming a part of this electrode structure is a grounded electrode 26 comprising a deck 27 extending substantially across the tank 10 and supported on a flange 27a suitably secured to the inner wall of the tank. Formed in this deck are openings 28, each of which is adapted to receive a sleeve electrode 30 forming a part of the grounded electrode 26. The details of this sleeve electrode are best shown in Fig. 3. The lower end thereof is in the form of a skirt 32 of frusto-conical shape, the walls thereof converging upward. The upper end of the sleeve electrode 30 is in the form of a neck 33 and extends through one of the openings 28 and has a collar 34 suitably secured thereto above the deck 27, this collar preventing the sleeve electrode from dropping from the opening. A roll edge is provided at the upper portion of the sleeve electrode for the purpose of eliminating corona discharge therefrom. This roll edge may be formed on the collar 34 or if the sleeve electrodes are otherwise secured in the openings 28 may be formed on the sleeve electrode itself.

In addition to the openings 28 the deck 27 provides openings 35 which are in communication with short return pipes 36 secured to the lower surface of the deck 27 and extending downward between adjacent sleeve electrodes. These pipes comprise a fluid-flow means for conducting fluid from the upper side of the deck 27 into the space therebelow, these pipes preferably terminating a distance above the lower edges of the skirts 32.

Supported above the deck 27 by insulators 40 is a supporting structure 41 forming a part of a live electrode 42 which in turn forms a part of the electrode structure 25. This supporting structure is preferably formed of a plurality of supporting members 45 suitably secured to transverse members 46. It will be seen from Fig. 2 that one of the members 45 or 46 extends directly above each of the openings 28, and the supporting structure 41 is adapted to retain a plurality of rod electrodes 47 which extend centrally downward into the sleeve electrode 30.

A plurality of tapered treating spaces 50 are thus defined between the rod electrodes 47 and the sleeve electrodes 30, these treating spaces tapering upward. An electric field is established in these treating spaces, as well as between the supporting structure 41 in the deck 27, by means of a transformer 51, one terminal of the secondary 52 of which is connected to the live electrode 42 through a suitable bushing 53, and the other terminal of which is grounded to the tank 10.

In the operation of my device, the emulsion or other fluid is forced through the pipe 16 under pressure and is distributed in the tank 10 by the baffle plate 19 so that a slowly rising body of emulsion is present in the preliminary treating space. If desired the treater may be started with the tank 10 fully charged with dry oil, but eventually the preliminary treating space 22 will contain a rising body of emulsion which is directed into the treating spaces 50 and is therein subjected to a field of increasing intensity due to the upward convergence of the walls of the sleeve electrodes 30. Due to the fact that substantially the whole horizontal cross-sectional area of the interior of the tank 10 is filled with the sleeve electrodes 30, the upward velocity in the treating spaces 50 is relatively low and a coalescence of the dispersed water takes place, and the liquid particles thus formed may drop downward from these fields without being carried upward through the necks 33. The result is that the oil in the neck 33 of each sleeve electrode 30 is much drier than that in the skirt 32, the water content, in fact, decreasing throughout the length of the skirt 32. There is thus a decreased tendency toward short-circuiting due to this separation in the field itself, the oil in the most intense portion of the field being the driest. Any water particles which are carried through the necks 33 of the sleeve electrodes 30 will drop on the deck 27 and be removed therefrom through the return pipes 36.

The results obtained by the use of this apparatus are due not only to the separation which takes place in the spaces 50, but also to the charged particles which drop from these treating spaces through the preliminary treating space 22, this space providing electric fields between the lowermost ends of the live rod electrodes 47 and the baffle plate 19. My experience indicates that water particles which separate from the emulsion in the treating spaces 50 and drop downward therefrom, are definitely charged, due to the voltage impressed across these fields. This charge may be acquired either by direct contact with the live electrode, or may be impressed on the water particles by induction. I have observed, however, that with the electrode structure shown, wherein a relatively small central electrode is surrounded by a sleeve electrode, that agglomeration of the water particles takes place primarily at a section immediately adjacent the central electrode. These water particles then flow down the central electrode and drop from the lower end thereof in the form of droplets which are electrically charged. These charged water particles are of a greater density than the density of the emulsion and drop downward through this rising body of emulsion in the preliminary treating space 22. I have found that these charged particles exert a preliminary treatment on the upward moving emulsion, and that this preliminary treatment is, in some instances, sufficient to separate those water particles in the rising emulsion which are only loosely bound. In addition, any particles which are tightly bound in the separated emulsion are given a preliminary treatment which my experiments indicate is a very desirable one, especially where the emulsion is shortly thereafter subjected to the field set up in the treating spaces 50.

The upward flow of the emulsion is in part regulated by the amount of dry oil passing through the dry outlet pipe 12 and by the water passing out of the water bleed pipe 14 and through a conventional water drain 60, indicated in Fig. 1.

The foraminous nature of the live electrode 42 is an important detail, although not essential, inasmuch as it permits the dry oil to rise directly to the upper end of the tank 10 and be removed through the dry oil outlet pipe 12 without being forced to move across the adjacent collar 34 as would be the case if a solid plate were used for the live electrode 42. The fluid-flow means formed by the pipes 36 and openings 35, or, in some instances, merely by the openings, thus also forms a feature of the present invention inasmuch as it prevents any layer of water from building up on the deck 27 with a consequent larger short-circuiting tendency between this layer and the live electrode 42.

The shape of the electrodes 30 is another important improvement over the art, especially when upward converging walls are utilized and when the emulsion is supplied upward thereinto so that the separated water particles may drop downward without being necessarily passed through the most intense portion of the field.

The preliminary treatment effected by these charged particles in passing downward through a rising body of the emulsion to be treated is also very advantageous and materially assist the separating action which takes place.

While I have shown and described my invention as being particularly applicable to the treatment of petroleum emulsion of the water-in-oil type, it should be clear that I am not limited to this type of emulsion. Furthermore, my process and apparatus are useful with certain other fluids where it is desirable to separate certain suspended particles therefrom.

I claim as my invention:

1. A method of treating an emulsion comprising a continuous phase of oily material and a dispersed phase of water by the use of a plurality of downward extending rod-electrodes maintained at a potential above ground potential and positioned in the upper end of a chamber, which method includes the steps of: continuously introducing the emulsion to be treated into the lower portion of said chamber; moving said emulsion upward in said lower portion of said chamber and toward the lowermost ends of said downward extending electrodes; and establishing electric fields around said rod-electrodes whereby the dispersed water particles of said emulsion are agglomerated around said rod-electrodes and flow downward therearound due to their being of greater density than the oily material of said dispersed phase, the agglomerated water dropping from the lower ends of said rod-electrodes and carrying the charge of the rod-electrodes, the upward moving emulsion moving at such low velocity that said agglomerated water drops downward therethrough to effect a preliminary treatment of this incoming emulsion.

2. A method of electrically treating an emulsion in a chamber, which method includes the steps of: setting up an electric field at a given portion of said chamber; introducing said emulsion into said field whereby the particles of the dispersed phase are coalesced; moving a portion of these coalesced particles downward in said field and from the lower end thereof; moving a mixture of said coalesced particles and the continuous phase of said emulsion from the upper end of said electric field; separating said mixture in an upper portion of said chamber immediately above said electric field; moving the seperated coalesced particles downward from said upper portion of said chamber in spaced relation with said field and to a position therebelow; establishing another electric field at a position below said first-mentioned electric field; and returning said separated coalesced particles to this other electric field after they have moved to a position below said first-mentioned field.

3. A method of electrically treating an emulsion in a chamber, which method includes the steps of: setting up an electric field at a given portion of said chamber; introducing said emulsion into said field whereby the particles of the dispersed phase are coalesced; moving a portion of these coalesced particles downward in said field and from the lower end thereof; moving a mixture of said coalesced particles and the continuous phase of said emulsion from the upper end of said electric field; separating said mixture in an upper portion of said chamber immediately above said electric field; moving the separated coalesced particles downward from said upper portion of said chamber and through an equipotential space positioned in spaced relation with said field and to a position therebelow; establishing another electric field at a position below said first-mentioned electric field; and returning said separated coalesced particles to this other electric field after they have moved to a position below said first-mentioned field.

4. A method of treating an emulsion by the use of a downward extending live rod electrode spaced above a plate, both positioned in a chamber, which method includes the steps of: setting up an electric field around said rod electrode; setting up a potential difference between the lower end of said rod electrode and the surface of said plate to set up an auxiliary electric field; subjecting the emulsion to be treated to the action of said field around said rod electrode whereby the dispersed particles of said emulsion are coalesced immediately around said rod electrode and move downward from the lower end thereof toward said plate through said auxiliary electric field; withdrawing the material of the continuous phase from the upper end of said chamber; and removing the coalesced material of the dispersed phase from said chamber at a point below said plate.

5. A method as defined in claim 4 including the step of moving the emulsion to be treated upward in that portion of said chamber lying between said plate and said field around said rod electrode and thence into said field around this electrode.

6. A method as defined in claim 4 including the step of flowing the emulsion to be treated upward in an annular path concentric with the projected axis of said rod electrode and in that portion of said chamber between said rod electrode and said plate and hence into said electric field around said rod electrode.

7. A method of treating emulsions by the use of a rod electrode and a plate disposed in spaced relationship with the end thereof, which method includes the steps of: introducing into a chamber at a level below the lowermost end of said rod electrode an emulsion; establishing an electric field around said rod electrode and highly concentrated thereadjacent and of a voltage gradient higher at the upper end of said field than at the lower end thereof; moving said emulsion upward in said chamber and into the lower portion of said field and upward therein into the higher-gradient portions of said field until at least a portion of the dispersed phase is coalesced in the zone immediately around said rod electrode into masses of sufficient size to move downward and from said lowermost end of said rod electrode thus forming charged masses which move downward through the rising emulsion in said chamber; and maintaining a potential difference between said lowermost end of said rod electrode and said plate to establish an electric field acting on said coalesced masses.

HARMON F. FISHER.